United States Patent
Kravis et al.

(10) Patent No.: US 10,469,880 B1
(45) Date of Patent: Nov. 5, 2019

(54) PROVIDING ALTERNATIVE LIVE MEDIA CONTENT

(71) Applicant: Amazon Technologies, Inc., Seattle, WA (US)

(72) Inventors: Alexandria Way-Wun Kravis, Seattle, WA (US); Joshua Danovitz, Seattle, WA (US); Brandon Scott Love, Seattle, WA (US); Felicia Yue, Mukilteo, WA (US); Jeromey Russell Goetz, Seattle, WA (US); Lars Christian Ulness, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 21 days.

(21) Appl. No.: 15/714,147

(22) Filed: Sep. 25, 2017

(51) Int. Cl.
*H04N 21/2187* (2011.01)
*H04N 21/234* (2011.01)
*H04N 21/8547* (2011.01)

(52) U.S. Cl.
CPC ....... *H04N 21/2187* (2013.01); *H04N 21/234* (2013.01); *H04N 21/8547* (2013.01)

(58) Field of Classification Search
CPC ............. H04N 21/242; H04N 21/8106; H04N 21/2368; H04N 21/482; H04N 21/233; H04N 21/23439; H04N 21/2665; H04N 21/8547; H04N 5/602; H04N 19/177; H04N 21/2187; H04H 60/04
See application file for complete search history.

(56) References Cited

U.S. PATENT DOCUMENTS

| | | | | |
|---|---|---|---|---|
| 2011/0138433 A1* | 6/2011 | Whiteing | ............. | H04N 21/242 725/114 |
| 2011/0202967 A1* | 8/2011 | Hecht | ................ | H04N 21/2187 725/114 |
| 2012/0128061 A1* | 5/2012 | Labrozzi | ........ | H04N 21/234354 375/240.02 |
| 2013/0057759 A1* | 3/2013 | Suess | ..................... | G11B 27/10 348/462 |

* cited by examiner

*Primary Examiner* — Hai V Tran
(74) *Attorney, Agent, or Firm* — Weaver Austin Villeneuve & Sampson LLP

(57) ABSTRACT

Techniques are described for providing alternative media content to a client device along with primary media content.

15 Claims, 4 Drawing Sheets

PROVIDING ALTERNATIVE LIVE MEDIA CONTENT

BACKGROUND

Live media content includes channels or feeds of live broadcasts (e.g., sporting events, news, etc.). Unlike video-on-demand (VOD) content, live content may not have a distinct end point and may continue indefinitely. In addition, VOD content may be buffered or otherwise stored in client devices well in advance of the client playhead (i.e., the content fragment currently being rendered by the client). This is typically not the case for live content because of the fact that the delay between the live playhead (i.e., the latest content fragment available) and the client playhead may be only a few seconds, as well as the fact that the live content is often generated in real time and therefore may not yet exist.

DETAILED DESCRIPTION

This disclosure describes techniques for providing alternative media content to a client device. Instead of receiving only a stream based on a primary live feed, a user may select one or more alternative media feeds according to their preference. Alternative media content is then provided to the client device in a manner that can minimize interference with a user's playback experience (e.g., an alternative live feed that is out-of-sync with the primary live feed).

Figure 1:
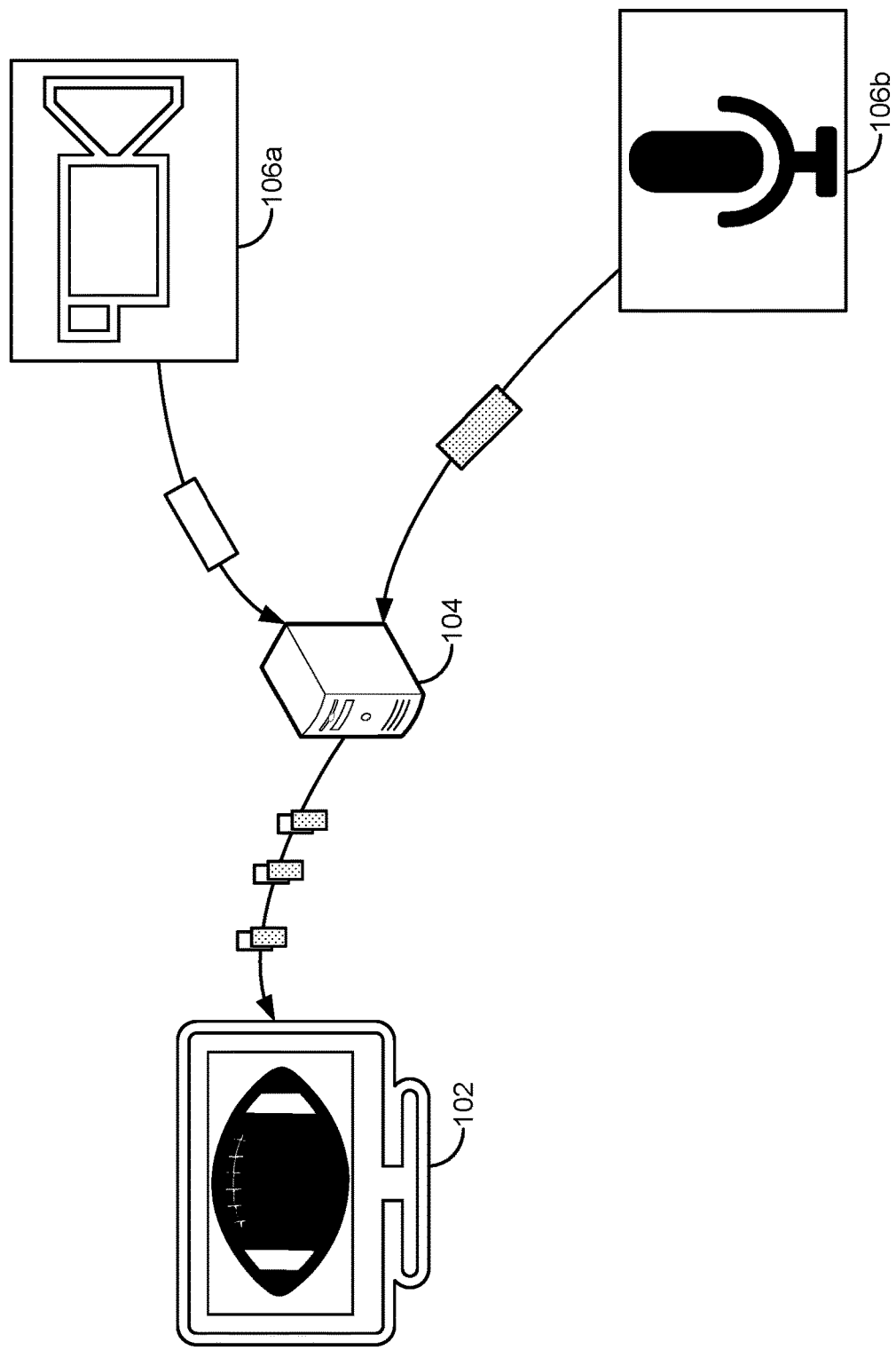
FIG. 1 illustrates an example of a system for providing alternative live media content according to a particular implementation.

An example using FIG. 1 may be instructive. In FIG. 1, client device 102 sends a request for playback of a primary live content (e.g., a live football game captured via content provider 106a) to media server 104. In this example, the request for playback is sent after a user selects a football game option through the user interface of the Amazon Video application on their smart TV. Media server 104 then provides a live stream of the football game to client device 102. After watching the football game for some time, the user of client device 102 decides she wants to watch the game with commentary from local announcers instead of the national announcers. The user navigates to a user interface that includes a variety of alternative live content (e.g., audio from local broadcast announcers, alternative camera angles, audio from a player, etc.) for streaming along with the football game. The user selects the local announcer option from the user interface and client device 102 sends a request for the local announcer audio to media server 104.

As the request from client device 102 is received, media server 104 is also receiving the football game feed from content provider 106a, the local announcer feed from content provider 106b, and other alternative media feeds from different content providers. Media server 104 identifies the live playhead (i.e., the most recently encoded fragment of a live stream that is available for request by the client device) of the football game and assigns a timestamp to the live playhead using a master clock component controlled by media server 104. The timestamp represents the time that the live playhead was received and/or ready for delivery to client devices. In the example of FIG. 1, media server 104 assigns a timestamp of "02:02:01." Media server 104 also identifies the live playhead of the local announcer feed and assigns a timestamp to the live playhead using the master clock component. In this case, media server 104 assigns a timestamp of "02:02:02."

For various reasons, such as geographic distance, bandwidth constraints, delay that is artificially introduced by administrator configuration, etc., live media feeds may reach media server 104 at different times. This can be particularly problematic where two live media feeds concerning the same event in time (e.g., a touchdown pass) are out-of-sync on a client device. To address this issue, techniques enabled by the present disclosure allow for two feeds to be combined and synchronized in a manner that results in a satisfactory playback experience.

In order to synchronize the audio from the local announcers with the football game, media server 104 determines an offset based on the time stamps, e.g., 1 second. Media server 104 then uses the offset to generate a combined live stream of the football game feed and the local announcer feed. For example, the combined stream includes a video fragment that has a start time that is offset by 1 second such that it aligns with the original start time of the audio fragment. Media server 104 then provides the combined stream to client device 102.

Figure 2:
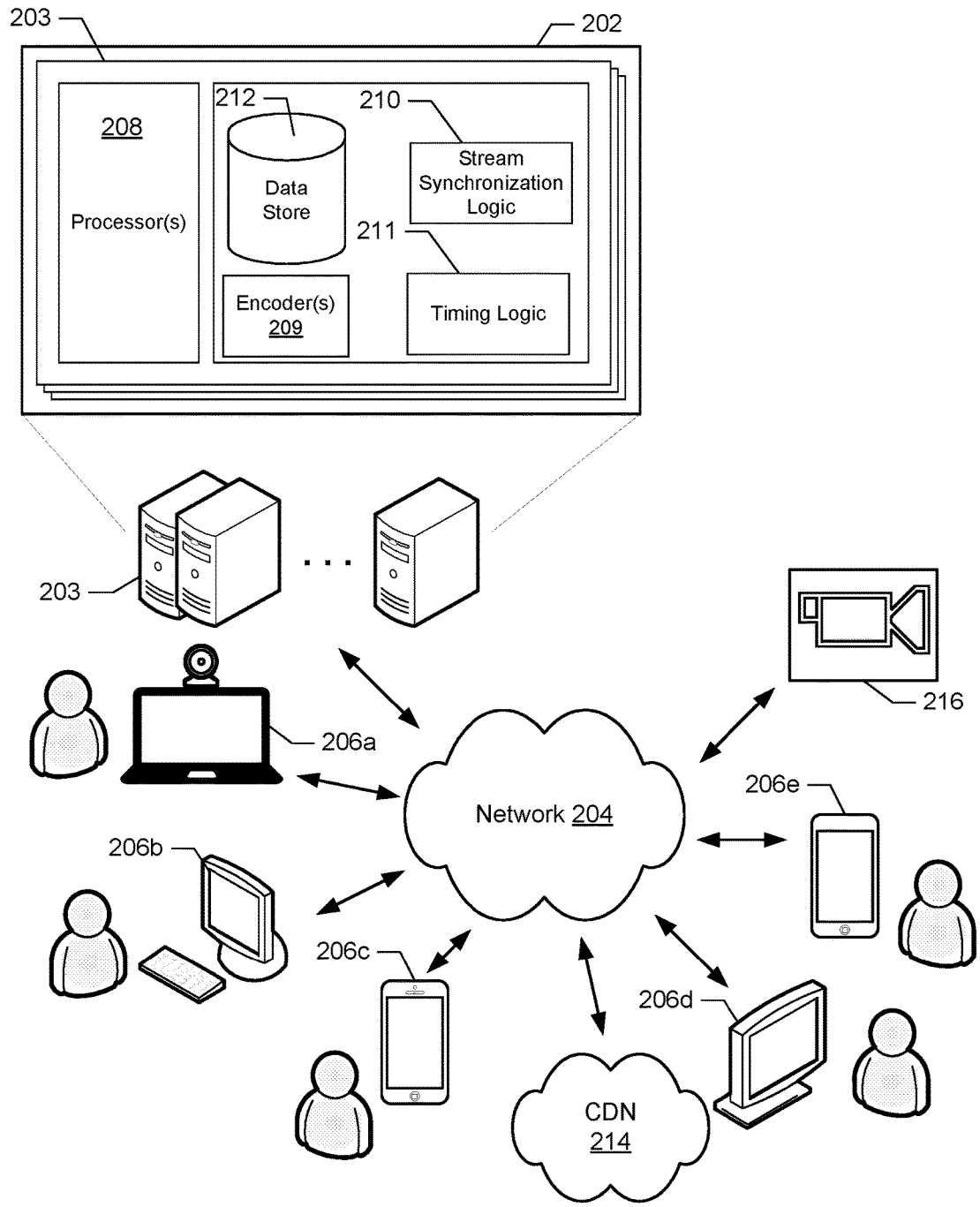
FIG. 2 is a simplified diagram of a computing environment in which various implementations may be practiced.

FIG. 2 illustrates an example of a computing environment in which a video content service 202 provides live streaming content and on-demand content (e.g., audio or video) via network 204 to a variety of client devices (206a-e) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, HTTP networks, TCP/IP-based networks, telecommunications networks, wireless networks, satellite networks, cable networks, public networks, private networks, wide area networks, local area networks, the Internet, the World Wide Web, intranets, extranets, etc. Client devices 206a-e may be any suitable device capable of connecting to network 204 for streaming on-demand and live streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches), etc. In addition, client devices with digital cameras such as client device 206a can be used to provide alternative content feeds. Client devices 206a-e can include and/or communicate with voice-enabled devices capable of processing human voice signals and determining commands based on the signals, e.g., requesting playback of a football game.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

Server 203 may be implemented by a variety of physical servers and/or virtual servers. In some implementations, server 203 is partitioned to have separate virtual servers configured to perform different functions. In one example, one virtual server identifies root manifest data and metadata, while a second virtual server provides and dynamic manifest data and fragments to client devices 206a-e. Server 203 includes logic configured to make decisions relating to combining primary and alternative feeds enabled by the present disclosure (e.g., as represented by stream synchronization logic 210). For example, such logic might be configured to identify live playheads of media feeds and assign timestamps to the live playheads using a master clock component. The master clock component might be part of logic 210 or implemented separately as its own logic as shown in FIG. 2. Logic 210 is also configured to determine an offset based on the timestamps and generate a combined stream using the offset. Stream synchronization logic 210 can also periodically update and refine the combined stream over time as a streaming session continues.

Encoder 209 encodes the live content that it receives from content providers such as content provider 216. Encoder 209 uses encoding parameters and/or profiles to encode fragments of media content at various bitrates. For example, client device 202a might receive fragments encoded at a bitrate of 3,200 kbps, and client device 202b might receive fragments encoded at a bitrate of 2,400 kbps. Encoder component 218 can use a variety of variable bitrate encoding techniques including single-pass encoding, multi-pass encoding, constrained variable bitrate encoding, content type variable bitrate encoding, and any other lossless and/or lossy encoding technique that meets an encoding standard (e.g., MPEG-2, H.264, HEVC/H.265, etc.).

Encoder 209 along with timing logic 211 can assign timestamps to the live content feeds received from content providers. For example, encoder 209 may assign timestamps for every video frame of a fragment, every group of pictures, or the start of each fragment. After an encoding process, encoded media content (e.g., fragments) is stored in memory such as a local buffer for delivery to CDN 214 or to client devices 206a-e. Encoder 209 might use a variety of variable bitrate encoding techniques including single-pass encoding, multi-pass encoding, constrained variable bitrate encoding, content type variable bitrate encoding, and any other lossless and/or lossy encoding technique that meets an encoding standard (e.g., MPEG-2, H.264, HEVC/H.265, etc.). A combined live stream may be encoded according to a uniform set of encoding parameters to ensure that the visual appearance of the alternative live content and the primary live content appear similar during playback. When encoder 209 generates a combined live stream based on a primary live content feed and an alternative live content feed, the encoding process can include subsampling the live content such that quality of the primary content and alternative content is reduced in order for the that the combined stream can be consumed by a client device using similar a similar amount bandwidth as a live stream based on a single live feed. In certain implementations, a multiplexer might be implemented that includes statistical multiplexing logic configured to allocate encoding resources among a pool of encoders. For example, two encoders work in conjunction with each other to encode and generate a combined stream of the video of a football game with a video overlay of local commentators.

Stream synchronization logic 210 combines separate sources of media content into a single live stream. Stream synchronization logic 210 can combine any number of live content feeds into a single stream (e.g., one primary video feed and one audio feed; one primary video feed, one alternative video feed, and one alternative audio feed; or four alternative video feeds and one primary audio feed). Stream synchronization logic 210 can also facilitate delivery of metadata with a primary live feed that enables display of alternative content that includes images and related information (e.g. real-time statistics, etc.).

Stream synchronization logic 210 in conjunction with timing logic 211 can synchronize live content feeds for seamless delivery to a client device. Synchronizing different live content feeds can be achieved through a variety of techniques. In a simple example, if the live playheads of the primary live content and the alternative live content concern the same event (e.g., a fumble) and are received by server 203 at roughly the same time, then timestamps assigned to each playhead relatively accurate and useful for generating a combined live stream. However, this will not typically be the case. Alternative live content will typically arrive at server 203 sometime after primary live content has arrived (e.g., 0.1 seconds to 10 seconds).

In certain implementations, information from the live content feeds can be used to automatically adjust the relative timing of the feeds before generating a combined stream. In some implementations, as a live content feed is received by server 203, the live content is processed using content recognition techniques that can be used to classify the live content according to different categories. The amount of live content that is used to for recognition can vary, for instance, a single frame, a few frames, a group of pictures, etc. The content recognition techniques can include averaging pixel values at a designated location in a frame to generate a fingerprint that can be used for comparison with other fingerprints across different sources of live content. For each fingerprint generated, a timestamp can be assigned. In some cases, fingerprints corresponds to an event or category that can be used for comparison across sources of live content. For example, if the live content received from the primary content provider includes a sequence of frames that represents two football teams lining up on the line of scrimmage with minimal movement, then the average pixel values across the sequence of frames would be relatively unchanged from frame to frame. As such, stream synchronization logic 210 might be configured to identify the sequence of frames as an event representing the start of a play. Similarly, if live content received from an alternative content provider included a sequence of audio frames that represented an announcer saying, "Both teams are at the line of scrimmage," stream synchronization logic 210 might also be configured to identify the sequence of audio frames as a start of a play event. Synchronization logic 210 can then use the identified events and associated timestamps to align the primary live content with the alternative live content and generate a combined live content stream.

Stream synchronization logic 210 can monitor a combined live stream to determine whether a combined streams is drifting out-of-sync. Even after successfully synchronizing live content feeds, combined live content streams can drift out of alignment for a variety of reasons as time passes (e.g., computing resource changes of any of the devices involved, change in encoding resources, changes in the medium of distribution, general traffic changes throughout the internet, etc.). Encoders are particularly prone to drifting out of alignment. In order to avoid drift between a group of encoders, synchronization refreshes may be generated periodically (e.g., every 5, 10, 15 minutes) by stream synchronization logic 210. The amount of drift can vary from a few milliseconds to a few seconds. To illustrate, after initializing fragment alignment, a first encoder sends out a synchronization request 15 minutes later to the other encoders involved in generating a combined live stream. Upon receiving an indication that an encoder has drifted 100 milliseconds from one of the other encoders in the group (e.g., based on conflicting timestamps), a new offset is determined or an existing offset is adjusted without interruption in playback. In other cases, if one of the encoders indicates significant drift, e.g., 1 second, then an error message might be sent to a client device while the primary live content feed and alternative live content feed are recombined.

Timing logic 211 includes instructions and techniques for maintaining universal time across live media feeds that are created across geographical regions. Timing logic 211 can utilize a number of time sources to ensure accurate capture of time. Examples of time sources include satellite-based sources, GPS time, Network Time Protocol time, local venue time, other content providers in close geographical proximity, etc. In certain implementations, timing logic 211 uses more than one time source to ensure the proper timestamp value to assign. Inaccuracy from one time source might be caused from latency introduced in the live content when the live content is transmitted from a camera at the football game to a satellite and then back to a receiving station for delivery to service 202. Another source of inaccuracy is caused by a timestamp received from a video production truck at the football game using an inaccurate clock. As such, the use of more than one time source by timing logic 211 can prevent clocking issues that might arise from using just a single time source.

Timing logic 211 also includes instructions for assigning timestamps. In certain cases, the primary live content feed provided to server 203 includes their own source timestamps. The source timestamps can represent local stadium time or any local time where the content was generated. The source timestamps can be used by timing logic 211 to supplement or revise the timestamps generated by a master clock component. The timestamp may be received by server 203 in the form of a header as part of an HTTP response. In some implementations, the master clock component might be located at a device not controlled by content service 202. For example, instances of the master clock component might be located at the devices controlled by different content providers. Each of the instances can be configured to communicate among each other, allowing for timestamps to be assigned locally among geographically separated devices according to a universal time keeping system.

In addition to providing access to live content, server 203 may also include a variety of information related to the live content (e.g., various types of metadata and manifest data in data store 212 to which service 202 provides access). Alternatively, such information about the live content, as well as the live content itself may be provided and/or hosted by one or more separate platforms or databases, e.g., CDN 214. CDN 214 may help facilitate distribution of live content through a variety of software, hardware, and network components to client devices according to geographic proximity. It should be noted that while logic 210 and data store 212 are contemplated as integrated with server 203 of content service 202, implementations are also contemplated in which either or both operate remotely from the associated content service, and/or either or both are under the control of an independent entity. From these examples, those of skill in the art will understand the diversity of use cases to which the techniques described herein are applicable.

Content provider 216 includes one or more devices capable of capturing and encoding live content for delivery to content server 202. Content provider 212 can include a live encoder that may be implemented using software, hardware, or both software and hardware components. The encoder can use a variety of constant bitrate techniques and variable bitrate encoding techniques, for instance, single-pass encoding, multi-pass encoding, constrained variable bitrate encoding, content type variable bitrate encoding, and any other lossless and/or lossy encoding technique that meets an encoding standard, e.g., HEVC/H.265. This and other examples described herein assume the use of H.265 encoding for live media content. However, it will be understood that the basic principles described herein may be employed with any of a variety of video and audio codecs and streaming technologies.

Client devices 206a-e can also include various types of logic, for instance, decoder logic for decoding the encoded media content received from edge server 204a and playback handling logic to request playback of portions of media content. In addition, client devices 206a-e includes various types of memory to store and/or cache decoded media, one or more processors, and other hardware components to request and decode the encoded media content provided by server 203. For example, the processors of client devices 206a-e execute stored instructions in memory to implement decoding and content retrieval techniques based on the encoding techniques disclosed herein. In addition, client devices 206a-e may communicate with server 203 through different types of network protocols such as a stateful connection, e.g., a physical socket connection between server and client, or using a stateless connection, for instance, using the Hypertext Transfer Protocol (HTTP).

It should be noted that, despite references to particular computing paradigms and software tools herein, the computer program product and the computer program instructions on which various implementations disclosed herein are based may correspond to any of a wide variety of programming languages, software tools, and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Figure 3:
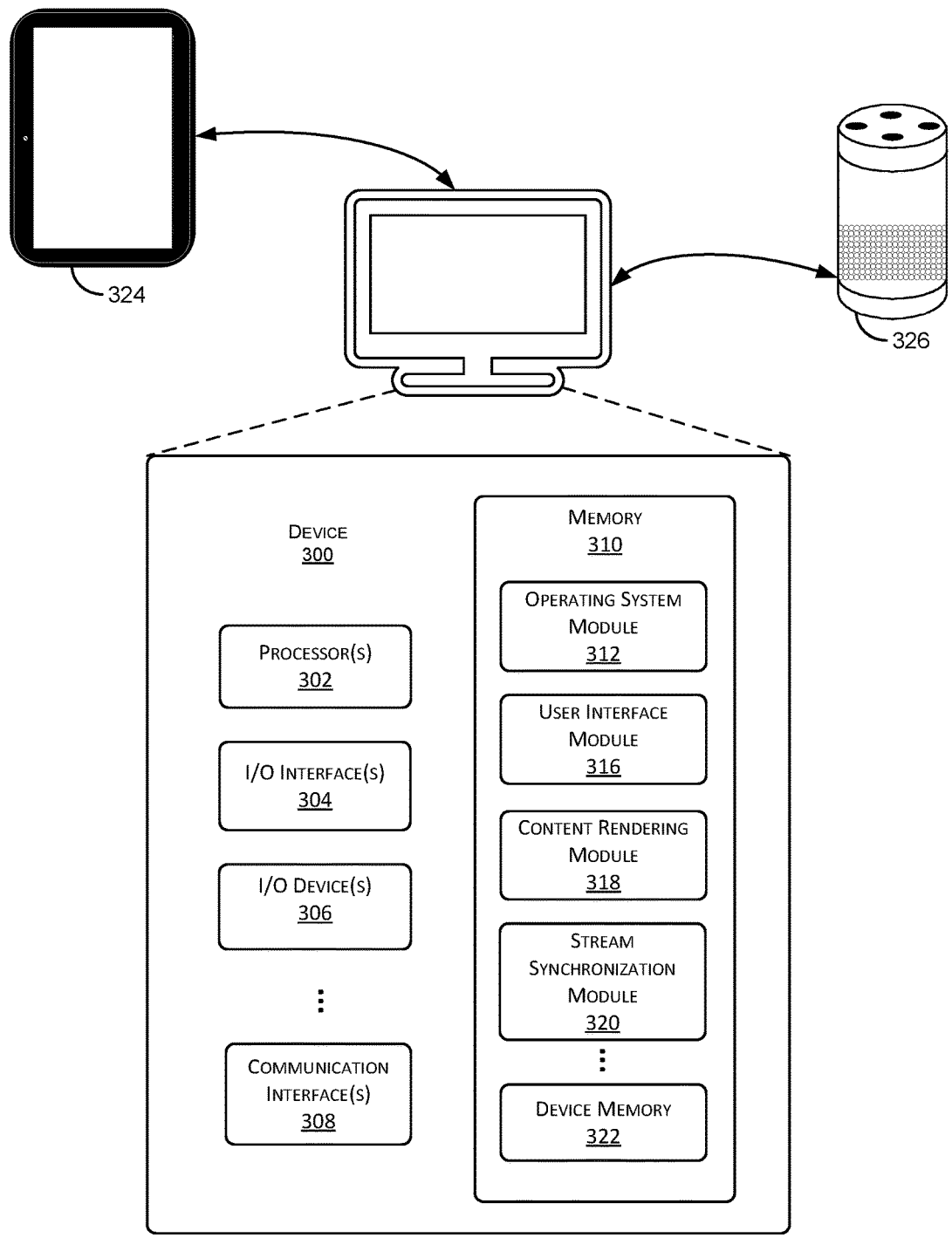
FIG. 3 illustrates an example of a client device and viewer environment in which various implementations may be practiced.

A block diagram of an example of a client device 300 suitable for use with various implementations is shown in FIG. 3. Device 300 includes one or more single or multi-core processors 302 configured to execute stored instructions (e.g., in device memory 330). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. I/O device(s) 306 may include one or more remote controls, infrared sensors, displays, one or more cameras, microphones, speakers, and so forth.

Device 300 may also include one or more communication interfaces 308 configured to provide communications between the device and other devices. For example, second-screen enabled device 324, voice-enabled device 326, or content service 202 of FIG. 2. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a Wi-Fi LAN and a Bluetooth PAN. Device 300 also includes one or more buses or other internal communications hardware or software (not shown) that allow for the transfer of data and instructions between the various modules and components of the device. Voice-enabled device 326 and/or second-screen enabled device 324 can communicate with device 300 over a local Wi-Fi network or through a Bluetooth communication network.

Screen-screen enabled device 324 includes logic for displaying second-screen functionality such as display of alternative live content options, social network feeds, various user interface elements, analytics and statistics about the football game, etc. Device 324 may include a display, one or more haptic generators, a touch sensor array, one or more accelerometers, one or more image capture systems, one or more motion sensors, one or more orientation sensors, microphones, speakers, and so forth.

Voice-enabled device 326 includes at least one microphone and at least one speaker to facilitate audio interactions with a user. The microphone of voice-enabled assistant 326 is configured to detect audio (e.g., a voice signal from the user) from the environment that the device is situated. Voice-enabled device 326 includes a processor and memory, which stores or otherwise has access to speech-recognition logic. Speech-recognition logic performs speech recognition on voice signals captured by the microphone. The user may speak commands such as "Play the Thursday night football game," which causes playback of the football to begin on device 300. The user may also control the selection of alternative content by speaking a command such as "Play my local commentary with the football game."

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, a stream synchronization module 320 and other modules. The logic might be implemented, for example, in a media player on the client device or as a separate application or module resident on the client device. The logic might be part of an existing algorithm or module on the client device or implemented to work in conjunction with such an algorithm or module. Memory 310 also includes device memory 330 to store a wide variety of instructions and information using any of a variety of formats including, for example, flat files, databases, linked lists, trees, or other data structures. In some implementations, a portion of device memory 330 may be distributed across one or more other devices including servers, network attached storage devices, and so forth.

At least some of the logic or computer program instructions used to synchronize primary content feeds with alternative content feeds may be located on client device 300. For example, at least some of this functionality may be implemented as part of the code of a media player operating on device 300. Suitable variations and alternatives will be apparent to those of skill in the art.

User interface module 316 includes logic for displaying user interface elements related to synchronizing live content feeds. User interface module 316 can present alternative live content options as part of a selection of icons (static or dynamic) overlaying the media player. In addition, user interface module 316 and content rendering module 318 can be used in conjunction to facilitate playback of combined live feeds. The user can select one of the displayed alternative live content options to customize their playback experience with as many alternative content feeds that they desire. In certain implementations, user interface module 316 allows for the user to select an option that enables the alternative live content to be displayed in place of the primary live content. At any time, the user can return to the overlay displaying the selection of live alternative content icons overlaying the media player multi-feed view to select another alternative live content option or return to the primary live content option. It should be appreciated that other user interface functionality and features are envisioned and contemplated within the scope of this disclosure.

Stream synchronization module 320 includes logic to perform processing and synchronizing combined live content streams sent by content service 202 of FIG. 2. Stream synchronization module 320 can be used to supplement or verify the synchronization of combined live streams performed by content service 202 of FIG. 2. In some implementations, stream synchronization module 320 can monitor a combined live stream to determine whether one live feed is drifting from another live feed and communicate with logic 210 of FIG. 2 to resync the combined live stream. Stream synchronization module 320 can also facilitate error resolution when a problem occurs with a combined live stream. For example, if for any number of reasons (e.g., the alternative content provider's laptop battery dies) an alternative live content is no longer being sent to the content service 202, an error message might be displayed on device 300 indicating that the alternative content is no longer available, prompting the user with a notification to return to the primary live content option or to choose another alternative live content option to include with the primary live content option.

Stream synchronization module 320 can also facilitate adjustment of a combined live stream through manual adjustment by a viewer. In certain implementations, after playback begins of a combined live stream, a notification is presented sometime later (e.g., 15-30 seconds later) on the display asking, "I hope your experience is great! Are the feeds synced?" Included with the notification is an option to select "Yes" or "No." If the feeds are not synchronized, a user may select "No," which sends a request to resynchronize the primary live feed with the alternative live feed. In other implementations, after viewing a combined live stream, a user notices that the alternative live content seems to be out-of-sync with the primary live content by approximately a second. As such, the user can select an option from the user interface to manually adjust the start time of the primary feed, e.g., by selecting a one second delay for the primary live feed.

It will also be understood that device 300 of FIG. 3 is merely an example of a device with which various implementations enabled by the present disclosure may be practiced, and that a wide variety of other devices types may also be used. The scope of this disclosure should therefore not be limited by reference to device-specific details.

A specific implementation will now be described with reference to FIG. 1, the computing environment of FIG. 2, the environment of FIG. 3, and the flow diagram of FIG. 4. A client device (e.g., client device 102 of FIG. 1) sends a request for live content that is received by a media server such as media server 104 of FIG. 1 (402). As mentioned above, a request for playback can be sent after a user selects the football game through their smart TV, which triggers the request for playback.

A user may also start a live streaming session in a variety of other ways. In one example, a user may use a voice-enabled device such as Amazon's Echo configured with a virtual personal assistant such as Amazon's Alexa to request playback of the live content. For example, a user might say, "Alexa, turn on the football game." The voice-enabled device processes the signal and determines that the signal is for a command to request playback of the football game and turn user's TV on for playback of the requested game. Other voice-enabled devices and virtual personal assistants may be used such as Apple's Ski, Google's Home, Microsoft's Cortana, etc. In another example, a user may start a live streaming session through a second screen-enabled device such as a tablet. For example, the user may navigate using an application on their tablet, which can communicate a playback request through their TV. Similarly, a user may switch live streams or begin a new live streaming session using the examples above.

A user may wish to include alternative live content while watching the football game. The user selects the alternative live content, which sends a playback request that is received by the media server (404). The user navigates to a user interface that includes a variety of alternative live content. In some implementations, the manner in which a user accesses and selects alternative live content may be similar to the examples discussed above. In other implementations, the selection of alternative live content may be performed in additional ways to those previously mentioned. For example, after beginning playback of a live football game, a user with a second screen-enabled tablet may be presented with a variety of information about the football game (e.g., statistics, newsfeeds, and alternative live content, etc.) The tablet may display the alternative live content options as part of a window overlay. A variety of other user interface configurations may be used, such as a drop down menu that is part of the user interface of the media player, but any other user interface configuration known to those skilled in the art may also be used. Examples of alternative live content that a user may choose from include audio from local broadcast announcers, alternative camera angles, audio from a player or coach, stadium audio, third party radio content provider, commentary from celebrities, alternate pre and or post game recaps of the game, personal user video, etc.

Returning to FIG. 4, a primary live media feed is received by the media server from a content provider (406). For example, video of a football game is captured by a set of High Definition (HD) cameras at the stadium and then sent to media server as a single live feed. A football game is one example of a live event contemplated by the disclosed techniques. A football game may use many cameras, e.g., 22 for a regular season game and over 60 for the Super Bowl. The cameras can capture close up views or particular players, overhead views or the game, end zone views of the game, a line of scrimmage view, and a variety of other perspectives of the game. The primary live feed switches between any of these cameras at different points throughout the football game, which is controlled by the media organization providing coverage. Viewers of the football game may be interested in a specific player on the field of play for various reasons such as being a fan of a player, a fantasy sports profile, or a bet on a player. Typically, the media organization providing coverage of the football game selects a limited number of camera perspectives that appeal to the broadest base of viewers. However, the camera perspective for the primary live feed may not match the viewer's interest, leading to a less than desirable customer experience that can be mitigated using the techniques discussed herein. A football game is one example of a live event contemplated by the disclosed techniques, but it should be understood that the disclosed techniques could be applied to all types of live events including, but not limited to, a baseball game, a basketball game, a golf tournament, a tennis match, a concert, auto racing, boxing, swimming, soccer, Olympic events, etc.

When the live feed is received by the media server which encodes or transcodes the feed to generate video fragments at various resolutions that correspond to the live playhead of the live content (408). The live playhead represents the most recently encoded fragment of a live stream that may be requested by a client device. In some implementations, a media server identifies and designates each new fragment generated as the live playhead. For example, a first fragment packaged for delivery is designated as the live playhead until the next fragment becomes available.

As the media server generates the live playhead fragment for delivery, a timestamp is assigned (410). For example, the media server provisions different encoders to receive the live media feeds, which assigns timestamps to each fragment when they become available for delivery. Fragments may be encoded according to uniform encoding profiles, for instance, the same bitrate options and fragment duration (e.g., 2 seconds). In this way, fragments that are encoded for different feeds may be properly aligned when combined into a single stream.

A master clock component controlled by the media server assigns timestamps according to a source time such as the network time protocol (NTP) at the media server. The master clock component is used as a way of maintaining a universal time across live media feeds that are created in different geographical regions. Alternatively, another universal source of time synchronization (e.g., HTTP time protocol, network time protocol, etc.) could be used. In some implementations, the timestamp represents when the media server received the portion of live content that became the live playhead. In other implementations, the timestamp corresponds to a time the media server received the live content compared to the source time of when the live content was sent by the content provider. In some implementations, if multiple encoders at the media server are encoding a single live stream, each encoder sends their timestamp for the live playhead to the other encoders.

Figure 4:
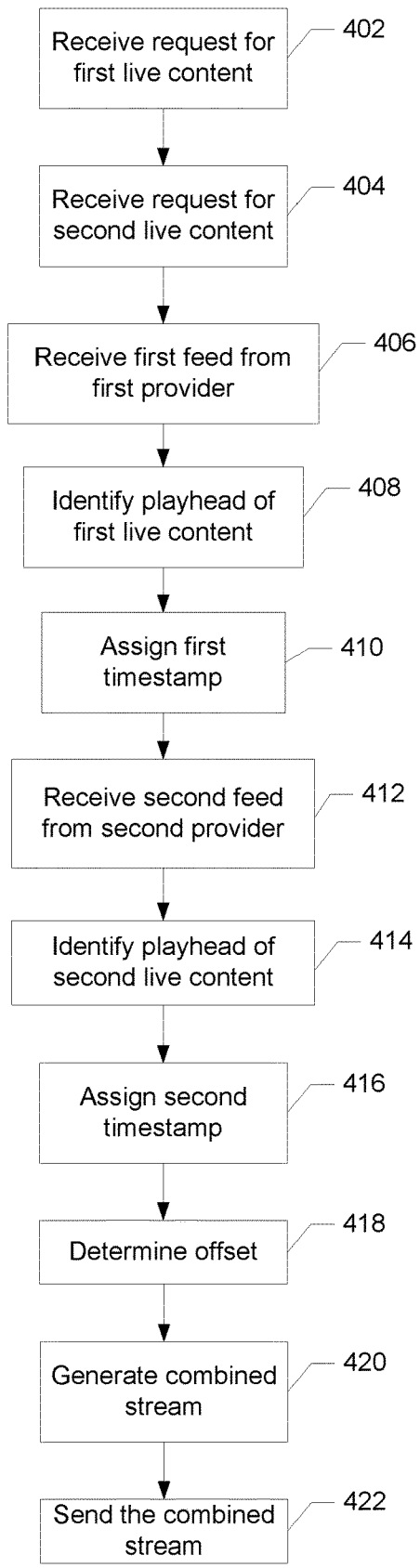
FIG. 4 is a flowchart illustrating operation of a particular implementation.

While the media server performs block 406-410 of FIG. 4 for the primary live media feed, the media server is performing similar steps for the alternative live feed. The media server receives an alternative live media feed (412), identifies the live playhead of the alternative live media feed (414), and assigns a timestamp to the live playhead (416).

After assigning timestamps for the live playheads of both the primary live media feed and the alternative live media feed, the media server determines the offset between the two timestamps (418). In some implementations, the offset is a time difference between the second timestamp and the first timestamp (e.g., 1 second), which represents the amount of delay between the two live media feeds. As one example, the media server identifies the live playhead of a live football game and assigns a timestamp of "02:02:01." When the media server also identifies the live playhead of the local announcer feed and assigns a timestamp of "02:02:02," the media server determines that there is a 1 second offset between the feeds. In some implementations, the determination of the offset is facilitated by additional time stamps such as a local clock of the devices recording the live content.

In some implementations, synchronization is achieved with user intervention. For example, any content provider that wants to provide an alternative live media feed could use a manual synchronization process to provide an offset for combining the feeds. One example of a manual synchronization process includes instructions from the primary content provider to the alternative content provider instructing the alternative content provider to start their feed at an exact time. The process may begin prior to the start of the primary live media feed. For example, a user may be prompted with a notification (e.g., on a display device if they are capturing alternative content through a personal computer) on their device that indicates when a user should begin their live feed. The notification might appear as a countdown timer that requests the user begin their feed at the end of the countdown (e.g., 10 seconds). When the countdown terminates, the alternative feed may automatically begin or a user may manually select a button that sends an indication to begin generating the alternative live content feed.

Another example of a manual synchronization might be employed through administrators of the content streaming service. The content streaming service can introduce an artificial delay in the primary live content before it is sent to client devices, for instance, a 15 second delay. During the 15 second delay, an administrator can be watching both the primary live content and the alternative live content that is to be synchronized and combined into a single stream. The administrator can determine where the primary live content and the alternative live content should align and adjust the start time as appropriate for the primary live content. For example, if the administrator notices in the football game that a fumble has occurred and three seconds later local commentators start discussing the fumble, then the administrator can adjust the start time by 3 seconds to synchronize the video of the football game with the audio from the local commentators. In certain implementations, a second administrator may perform a similar task for the football game and local commentators to ensure accuracy and reduce human error.

After determining the offset, the media server uses the offset to generate a combined stream (420). For example, video content from the live football game is combined with the audio from the local announcer audio feed. Within the combined stream, the video content is offset (by the offset determined in 418) to align with the audio content. The media server then provides the combined stream to the client device (422).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising one or more processors and memory configured to:
   receive a request for primary live content of an event from a client device;
   receive a request for alternative live content corresponding to the event from the client device;
   receive a primary live content feed from a first content provider;
   identify a live playhead of the primary live content feed, the live playhead of the primary live content feed corresponding to a first most recently encoded fragment of the primary live content feed that is available for request by clients;
   assign a first timestamp to the live playhead of the primary live content feed using a master clock component, the first timestamp representing a first time of the master clock component;
   receive an alternative live content feed from a second content provider different from the first content provider;
   identify a live playhead of the alternative live content feed, the live playhead of the alternative live content feed corresponding to a second most recently encoded fragment of the alternative live content feed that is available for request by clients;
   assign a second timestamp to the live playhead of the alternative live content feed using the master clock component, the second timestamp representing a second time of the master clock component that is later than the first time of the master clock component represented by the first timestamp;
   determine an offset based on the first timestamp and the second timestamp;
   align the live playhead of the primary live content feed with the live playhead of the alternative live content feed according to the offset;
   generate a combined live content stream based on the primary live content feed and the alternative live content feed and based on the alignment of the live playhead of the primary live content feed with the live playhead of the alternative live content feed; and provide the combined live content stream to the client device.

2. The system of claim 1, wherein the one or more processors and memory are further configured to:
receive an additional request for additional alternative live content from the client device;
receive an additional alternative live content feed from a third content provider different from the first content provider and the second content provider;
identify a live playhead of the additional alternative live content feed;
assign a third timestamp to the live playhead of the additional alternative live content feed using the master clock component;
identify an additional live playhead of the primary live content feed;
assign a fourth timestamp to the additional live playhead of the primary live content feed using the master clock component;
determine an additional offset based on the fourth timestamp and the third timestamp;
align the additional live playhead of the primary live content feed with the live playhead of the additional alternative live content feed according to the additional offset; and
generate, using the additional offset, a new combined live content stream based on the primary live content feed and the additional alternative live content feed.

3. The system of claim 1, wherein the offset represents a difference based on the first timestamp and the second timestamp, and wherein the one or more processors and memory are configured to generate the combined live content stream using the offset by assigning a new timestamp to the live playhead of the alternative live content feed, the new timestamp representing a sum of the offset and the second timestamp.

4. A system, comprising one or more processors and memory configured to:
receive a request for first live content from a client device;
receive a request for second live content from the client device, the second live content being different from the first live content, wherein the first live content represents primary live content and the second live content represents alternative live content related to the first live content;
identify a live playhead of the first live content, the live playhead of the first live content corresponding to a first most recently encoded fragment of the first live content that is available for request by clients;
assign a first timestamp to the live playhead of the first live content using a master clock component, the first timestamp representing a first time of the master clock component;
identify a live playhead of the second live content, the live playhead of the second live content corresponding to a second most recently encoded fragment of the first live content that is available for request by clients;
assign a second timestamp to the live playhead of the second live content using the master clock component, the second timestamp representing a second time of the master clock component that is later than the first time of the master clock component represented by the first timestamp;
determine an offset based on the first timestamp and the second timestamp;
generate, using the offset, a combined live content stream based on the first live content and the second live content by aligning the live playhead of the first live content with the live playhead of the second live content according to the offset; and
provide the combined live content stream to the client device.

5. The system of claim 4, wherein the one or more processors and memory are further configured to identify a first event based on a sequence of frames associated with the live playhead of the first live content and identify a second event based on a sequence of frames associated with the live playhead of the second live content, wherein the first event matches the second event.

6. The system of claim 4, wherein the one or more processors and memory are further configured to:
receive an additional request for new second live content from the client device;
identify a live playhead of the new second live content;
assign a third timestamp to the live playhead of the new second live content using the master clock component;
identify an additional live playhead of the first live content;
assign a fourth timestamp to the live playhead of the first live content using the master clock component;
determine an additional offset based on the fourth timestamp and the third timestamp; and
generate, using the additional offset, a new combined live content stream based on the first live content and the new second live content.

7. The system of claim 4, wherein the offset represents a difference based on the first timestamp and the second timestamp, and wherein the one or more processors and memory are configured to generate the combined live content stream using the offset by assigning a new timestamp to the live playhead of the second live content, the new timestamp representing a sum of the offset and the second timestamp.

8. The system of claim 4, wherein the one or more processors and memory are further configured to receive first live content from a first content provider and receive second live content from a second content provider different from the first content provider.

9. The system of claim 4, wherein the request for first live content was generated by the client device, a voice-enabled device, or a second screen enabled device associated with the client device.

10. A method, comprising:
receiving a request for first live content from a client device;
receiving a request for second live content from the client device, the second live content being different from the first live content, wherein the first live content represents primary live content and the second live content represents alternative live content related to the first live content;
identifying a live playhead of the first live content, the live playhead of the first live content corresponding to a first most recently encoded fragment of the first live content that is available for request by clients;
assigning a first timestamp to the live playhead of the first live content using a master clock component, the first timestamp representing a first time of the master clock component;
identifying a live playhead of the second live content, the live playhead of the second live content corresponding to a second most recently encoded fragment of the second live content that is available for request by clients;

assigning a second timestamp to the live playhead of the second live content using the master clock component, the second timestamp representing a second time of the master clock component that is later than the first time of the master clock component represented by the first timestamp;

determining an offset based on the first timestamp and the second timestamp;

generating, using the offset, a combined live content stream based on the first live content and the second live content by aligning the live playhead of the first live content with the live playhead of the second live content according to the offset; and providing the combined live content stream to the client device.

11. The method of claim 10, further comprising identifying a first event based on a sequence of frames associated with the live playhead of the first live content and identifying a second event based on a sequence of frames associated with the live playhead of the second live content, wherein the first event matches the second event.

12. The method of claim 10, further comprising:

receiving an additional request for new second live content from the client device;

identifying a live playhead of the new second live content;

assigning a third timestamp to the live playhead of the new second live content using the master clock component;

identifying an additional live playhead of the first live content;

assigning a fourth timestamp to the live playhead of the first live content using the master clock component;

determining an additional offset based on the fourth timestamp and the third timestamp; and generating, using the additional offset, a new combined live content stream based on the first live content and the new second live content.

13. The method of claim 10, wherein the offset represents a difference based on the first timestamp and the second timestamp, further comprising generating the combined live content stream using the offset by assigning a new timestamp to the live playhead of the second live content, the new timestamp representing a sum of the offset and the second timestamp.

14. The method of claim 10, further comprising receiving first live content from a first content provider and receiving second live content from a second content provider different from the first content provider.

15. The method of claim 10, wherein the request for first live content was generated by the client device, a voice-enabled device, or a second screen enabled device associated with the client device.

* * * * *